United States Patent [19]
Flynn

[11] 3,974,783
[45] Aug. 17, 1976

[54] METHOD FOR IMPROVING SEWAGE SLUDGE INCINERATION

[75] Inventor: Gardner Flynn, Audubon, Pa.

[73] Assignee: Nalco Chemical Company, Oak Brook, Ill.

[22] Filed: Aug. 22, 1975

[21] Appl. No.: 606,920

[52] U.S. Cl. .................................. 110/8 R; 44/1 D; 110/1 J; 110/8 P
[51] Int. Cl.² ........................................... F23G 5/00
[58] Field of Search ............. 110/1 J, 7 R, 8 R, 8 F, 110/8 P, 18 R; 44/1 R, 1 D

[56] References Cited
UNITED STATES PATENTS

| | | | |
|---|---|---|---|
| 2,844,112 | 7/1958 | Muller | 110/1 |
| 3,540,387 | 11/1970 | McLaren et al. | 110/1 |
| 3,888,194 | 6/1975 | Kishigami et al. | 110/8 |
| 3,916,805 | 11/1975 | Kalfadelis et al. | 110/1 |

*Primary Examiner*—Kenneth W. Sprague
*Attorney, Agent, or Firm*—John G. Premo; Robert A. Miller; Barry W. Sufrin

[57] ABSTRACT

An improved method of incinerating sewage sludge by adding to the sewage sludge prior to incineration a composition consisting of a compound of metal effective in lowering the ignition temperature of carbon and magnesium oxide.

5 Claims, No Drawings

METHOD FOR IMPROVING SEWAGE SLUDGE INCINERATION

This invention discloses a method for improving the operational efficiency of sewage sludge incinerators.

Sewage sludge incinerators are devices for heating sewage sludge in the presence of air until only ash remains. The incineration of sewage sludge is an increasingly popular means for disposing of sewage sludge. The major byproduct of this process-ash is conveniently disposed of; heat produced during the incineration may be utilized for such things as heating buildings and driving steam turbines.

Unfortunately, troublesome deposits are formed during the incineration process. For example, inorganic compositions such as slag form on various incinerator surfaces; clinkers or small slag masses accumulate within the system. These deposits and interfering masses tend to clog channels in the incinerator and they tend to generally impair its efficiency.

It has been found, for example, that in multiple hearth incinerators the formation of these deposits seriously hinders the operation of the incinerator by impairing the movement of incinerated sludge and ash from one tier within the incinerator to the next. Briefly described, a multiple hearth incinerator is composed of a number of tiers with scraping devices on each tier. Sewage, from which liquids have been filtered, enters the incinerator from above the highest tier. This sewage is retained for a time on the highest tier and heated. Scraping devices (known as rabble arms) slowly push the heated sludge to the edge of the top tier so that it falls onto the next lower tier. A more intense heating occurs on this tier since it is nearer to the heat source. The sludge is slowly pushed to the edge of this tier as it falls onto the next lower tier. The process is continued until the thoroughly incinerated sludge is pushed from the lowest tier in the form of an ash, and collected.

It has been found that slag in various forms accumulates on and around the tiers and the rabble arms. This slag interferes with the transfer of the sewage sludge from one tier to another; it also interferes with heat transfer within the system.

Another problem experienced in the incineration of sewage sludge is the production of corrosive compounds of a highly acidic nature during the incineration process. These corrosive compounds, which are probably sulfur oxides and sulfates, attack various parts of the incinerator as well as fans and pollution control apparatus used in the system.

One of the objects of the present invention is to provide an additive to the sewage sludge which will reduce or eliminate the formation of slag within the incineration system. Another object of the invention is to provide a method of rendering slag deposits more readily removable than would otherwise be the case. Another object of the invention is to reduce corrosion in the incinerator system which results from the acidity of gasses which are released from the sewage sludge during the incineration process.

In accordance with the invention, it has been found that sewage sludge incinerator deposits of slag in various forms are prevented or greatly reduced by treating the sewage sludge with from 50–8000 ppm by weight based on dry sewage sludge of an additive composition of a compound of a metal selected from the group consisting of copper, cobalt, manganese, iron and calcium which is effective in lowering the ignition temperature of carbon and a magnesium compound from the group consisting of magnesium oxide and magnesium compounds decomposing to magnesium oxide under combustion conditions, the weight ratio of said magnesium compound, expressed as Mg, to said compound of a metal expressed as said metal, being within the range of 5:1 to 35:1. In a preferred embodiment, 200–4000 ppm of the additive composition are used.

The essential components of the additive composition are preferably prepared in the form of a chemical composition in which the components are intimately mixed or blended together. The preferred components of the composition are magnesium oxide in the form of a very finely divided, high melting point powder and copper oxychloride.

In general, the quantity of the magnesium compound, expressed as Mg, will predominate over the quantity of the copper compound, expressed as Cu, and the preferred weight ratio of the respective compounds, expressed as Mg:Cu, is approximately 25:1 but can vary within a relatively wide range, for example 5:1 to 35:1.

Although magnesium oxide is the preferred type of magnesium compound employed in the practice of the invention, it will be understood that the magnesium oxide may be replaced wholly or in part by other magnesium compounds, either organic or inorganic, which decompose under the combustion conditions to form magnesium oxide. Among the compounds which may be mentioned for this purpose are magnesium hydroxide, magnesium carbonate and magnesium salts of fatty acids, including magnesium octoate (the magnesium salt of 2-ethyl hexanoic acid), magnesium laurate, magnesium stearate, magnesium linoleate, magnesium oleate, and the like.

Likewise, although copper oxychloride is preferably employed in the practice of the invention, other compounds of metals which are effective in lowering the ignition temperature of carbon can be employed in chemically equivalent amounts. Examples of other copper compounds which can be employed are copper naphthenate, cuprous chloride, cupric chloride, copper oleate, copper linoleate, copper stearate, copper octoate, copper salts of mahogany acids and copper salts of petroleum naphthenic acids. Where the composition is used as a fuel oil additive, good results are obtained by employing as the copper component a copper salt of 2-ethyl hexanoic acid or a copper salt of another branched chain acrylic aliphatic carboxylic acid containing 5 to 12 carbon atoms as disclosed in U.S. Pat. No. 2,622,671.

Chemically equivalent quantities of cobalt compounds may be substituted wholly or in part for the corresponding copper compounds in the practice of the invention. Examples of suitable cobalt compounds are cobalt naphthenate, cobalt oxychloride, cobaltic chloride, cobaltous chloride, cobalt tallate, the cobalt salt of 2-ethyl hexanoic acid, cobalt oleate, cobalt stearate, cobalt linoleate, cobalt linolenate and the cobalt salts of branched chain acyclic aliphatic carboxylic acids having 5 to 12 carbon atoms and containing a carboxyl group attached to the carbon atom other than the central carbon atom of the longest hydrocarbon chain.

While the invention is not limited to any theory, it is believed that the combined action of the active essential ingredients of the slag inhibiting additive composition in some way interferes with or alters the formation of sulfates of a type which would ordinarily produce adherent slag deposits. That the result is due to a combined or synergistic effect of the active essential components is indicated by the fact that neither magnesium oxide alone nor copper oxychloride alone will produce the desired result.

A further refinement in the method of this invention resides in the method of introducing the additive composition into the sewage sludge. In order to understand this aspect of my invention, it will be necessary to look briefly at the sewage sludge handling which typically precedes the introduction of the sludge into the incinerator.

The sewage sludge is moved from a clarifier, a digester or similar device to a sewage sludge holding tank. The sludge is then moved from the holding tank into a conditioning tank wherein coagulants and/or flocculants are added in order to increase particle size and improve the efficiency of the filtration step which follows. The conditioned sewage is then moved into a filtering pan which contains a vacuum filter device. This device separates the sewage solids from the sewage liquids or filtrate. The filtrate is removed and the solids are transferred on to a belt which moves them to the incinerator.

It has been found that addition of the conditioning agent prior to the entry of the sewage into the filter pan gives unexpectedly good results as compared to the results obtained when the conditioning agent is added at the point after the sewage leaves the filter pan. These enhanced results are believed to be due to the more thorough dispersal of the conditioning agent within the sewage which occurs during the filtration process. The improved results may also be due to the fact that the sewage remains in contact with the conditioning agent for a longer period of time than would be the case if the conditioning agent were added at a point further along in the process.

EXAMPLES

EXAMPLE 1

This test was undertaken to evaluate the treatment of sewage sludge with the additive composition of this invention. The additive composition employed contained 96% magnesium oxide and 4% oxychloride.

The additive composition was added to sewage sludge in a sewage treatment system similar to that described above. The point of application was well after the filtration pan. The composition was added in a powder form.

The dosage ranged from 333–1333 ppm based on the weight of dry sludge. The results were as follows:
A. The slag which formed was softer and more breakable than that which formed in the absence of the additive.
B. The pH measured at the wet scrubber of the incinerator stack was increased from the usual pH 0–2.0 to over pH 3.

EXAMPLE 2

The above described procedure was followed except that the additive composition was added at an earlier point in the system, although not before sludge passed through the filtration pan. The results obtained were the same as described in Example 1, except that pH was raised to almost pH 3.8.

EXAMPLE 3

This test was undertaken to demonstrate the advantage of introducing the additive composition prior to filtration of the sewage sludge. The additive composition and sewage treatment system of Examples 1 and 2 were again used. The point of application was prior to the filtration pan. The additive composition was added in powder form.

The dosage ranged from 333–1667 ppm based on the weight of dry sludge. The results were as follows:
A. Softness and breakability of the slag was at least as good as in Examples 1 and 2.
B. Slag build up was significantly reduced in many areas; in some places, slag build up disappeared completely.
C. The pH measured at the wet scrubber of the incinerator stack was increased to 4.0.

I claim:
1. A method of incinerating sewage sludge which comprises burning said sewage sludge in the presence of from 50–8000 ppm by weight based on dry sewage sludge, of an additive composition of a compound of a metal selected from the group consisting of copper, cobalt, manganese, iron and calcium which is effective in lowering the ignition temperature of carbon and a magnesium compound from the group consisting of magnesium oxide and magnesium compounds decomposing to magnesium oxide under combustion conditions, the weight ratio of said magnesium compound, expressed as Mg, to said compound of a metal expressed as said metal, being within the range of 5:1 to 35:1.
2. The method of claim 1 wherein said additive composition is added to said sewage sludge prior to the vacuum filtration of said sewage sludge.
3. The method of claim 1 wherein said compound of a metal is a compound of copper.
4. The method of claim 1 wherein said compound of a metal is copper oxychloride.
5. The method of claim 1 wherein the weight ratio of said magnesium compound, expressed as Mg, to said compound of a metal, expressed as said metal, is approximately 25:1.

* * * * *